VIBRATION-PROOF PROGRAM SYSTEM

Filed Feb. 25, 1965 4 Sheets-Sheet 1

INVENTORS
DONALD RICHARD HARNER
RONALD JOHN BROOKMAN
BY Curtis, Morris & Safford INVENTOR.
DONALD RICHARD HARNER
RONALD JOHN BROOKMAN
BY Curtis, Morris & Safford

VIBRATION-PROOF PROGRAM SYSTEM

Filed Feb. 25, 1965 4 Sheets-Sheet 3

INVENTOR.
DONALD RICHARD HARNER
RONALD JOHN BROOKMAN
BY Curtis, Morris & Safford

VIBRATION-PROOF PROGRAM SYSTEM

Filed Feb. 25, 1965 4 Sheets-Sheet 4

INVENTOR.
DONALD RICHARD HARNER
RONALD JOHN BROOKMAN
BY Curtis, Morris & Safford United States Patent Office 3,313,894
Patented Apr. 11, 1967

3,313,894

VIBRATION-PROOF PROGRAM SYSTEM

Donald Richard Harner, Camp Hill, and Ronald John Brookman, Lancaster, Pa., assignors to AMP Incorporated, Harrisburg, Pa.
Filed Feb. 25, 1965, Ser. No. 435,127
10 Claims. (Cl. 200—1)

This invention relates to an improved construction for patchboard programming assemblies which must operate in environments of substantial vibration and shock loading.

A patchboard programming assembly constitutes a form of switch wherein arrays of contact pin members interconnected by wires patched in program patterns are driven to close with complementary arrays of spring members connected to input and output leads from electrical or electronic components. A typical assembly is comprised of a back bay or panel which is relatively fixed and a front bay or panel which is driven in planar movement relative to the back bay to effect and maintain contact closure. Each bay is, in accordance with present day practice, comprised of one or a series of board members apertured to receive and contain the contact pins or springs with the board or boards being surrounded by a metallic frame. The front bay includes means disposed about the periphery adapted to engage means in the rear bay to hold the front bay in position and the rear bay includes a mechanism to drive the front bay. Typical constructions are shown in U.S. patents including No. 2,594,748 to H. D. Earl; No. 2,927,295 to G. C. Sitz and 3,133,775 to M. Plaxa. Plugboard systems having constructions generally similar to the types in these patents have met with considerable success in serving the needs of the computer and office equipment industry and the inherent utility and flexibility of application of such systems has led to extended uses in other places wherein there is a need to perform programming functions. For example, a considerable need has developed for programming systems to perform distinct changes in function of navigational equipment in vehicles, vessels and other moving equipment. The general use of programming systems has also been extended into the factory to control production equipment. These latter uses have introduced a design problem not presented in the typical computer or office equipment application wherein the programming apparatus is housed in a fixed structure, free of vibration and factors of acceleration, inertia, shock and the like.

The principal problem which appears to cause failure of existing systems in adverse environments is vibration which results in a temporary opening of contacts and circuits of the system. This opening causes arcing which destroys contact plating and can cause equipment failure through current surges which may or may not be fused for equipment protection. Furthermore, if the equipment served by the programming apparatus is being actively used for navigational or radar tracking or the like, even a temporary loss of function of the equipment cannot be tolerated. A second and like problem with existing systems is that of inertial shock wherein a sudden change in acceleration causes some internal flexure of the front and rear bay boards to again cause open circuits to occur.

Study of the failure mode arising due to vibration or shock has revealed the principal cause to be an effect termed "diaphragming," which means in simple terms that the panels and boards of the system bend or bow. This may happen due to a single sudden shock with one cycle of diaphragming or it may happen via a continuous displacement due to resonance of the system under influence of one or several planes of vibration. The present invention purports to deal with these problems through the provision of a novel structure found to substantially overcome the problem of undesirable open circuits in programming systems caused by vibration, inertial shock, acceleration or other causes of stress which tend to displace the structure of the system.

It is then one object of the invention to provide a programming assembly adapted to maintain its dimensional integrity in the presence of vibration, acceleration, shock and other stresses.

It is a further object of the invention to provide a simple and economical solution to the problem of diaphragming in programming assembly apparatus.

It is another object of the invention to provide a new type of latching and locking mechanism for programming devices adapted particularly to resist conditions which cause intermittent contact opening and circuit failure.

The present invention obtains these objectives and solves the foregoing problems through the addition of a plurality of resilient and non-resilient elements disposed between the facing surfaces of the assembly frames in the front and back bays thereof. In the specific embodiment herein included to disclose a preferred method of practice of the invention, a series of resilient pads are disposed within the outside channels of the assembly rear bay and affixed in spaced relationship to engage and be compressed by the side rails of the front bay of the assembly. This compression is accomplished by a series of hook members affixed to both bays for mutual engagement to develop spaced holding forces distributed in the center of the bay frame members and by a plurality of projecting posts disposed along the side rails of the front bay adapted to be engaged, cammed and locked within guiding and camming surfaces affixed within the side channels of the rear bay. Additionally, there is provided a novel locking and latching mechanism which is operable when the programming system is cammed upwardly to close its contacts to lock the assembly in position and is operable prior to such camming to latch the system in position. The approach of the present invention replaces prior art efforts centered on structures which rigidly lock the front and rear bays together in metal-to-metal contact at all points of engagement.

Reference may be had to the U.S. patents previously mentioned for a general description of the operation of plugboard devices.

Figure 1:
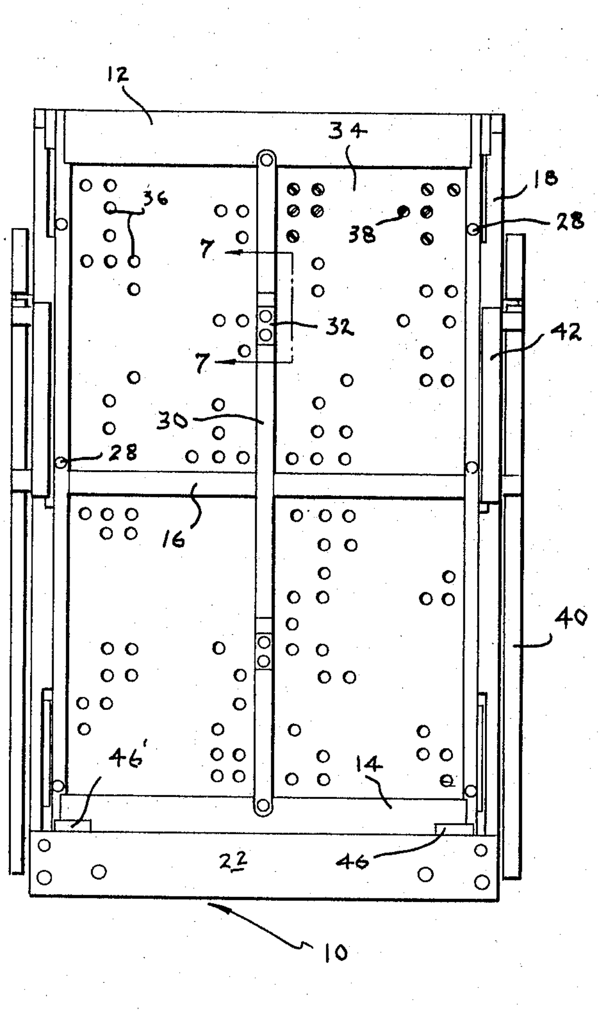
FIGURE 1 is a front elevational view of the rear bay of the assembly of the invention.

In the present invention, FIGURE 1, the assembly shown as 10 constitutes a plugboard rear bay with the front bay removed and with the operating handle in the position of closure. The assembly is comprised of an outer metallic frame of channel members suitably joined together at their ends and held together at the centers thereof by an inner cross frame of metallic members joined to each other and to the outer frame by suitable means. The outer frame may be seen to be comprised of upper and lower channels 12 and 14, and outside side channels such as 18. The inner part of the frame may be seen to be formed of a center horizontal channel 16 and a vertically disposed bar 30. In accordance with the invention assembly these members are made of a sufficient thickness relative to their strength characteristics to form a rigid structure. The members may be of stainless steel or a high tensile aluminum alloy suitably machined and cut to lengths to be fitted up in the configuration shown. Tightly secured within the frame members are a series of insulating boards 34 each containing an array of apertures such as 36, which in turn carry fixed contact springs such as 38, extending from the major plane of the board and twisted at a 45° angle oppositely oriented in alternate rows as shown. The springs 38 usually include a portion which extends to the rear of the rear bay to be terminated to input and output leads from equipment served by the programming device.

Figure 2:
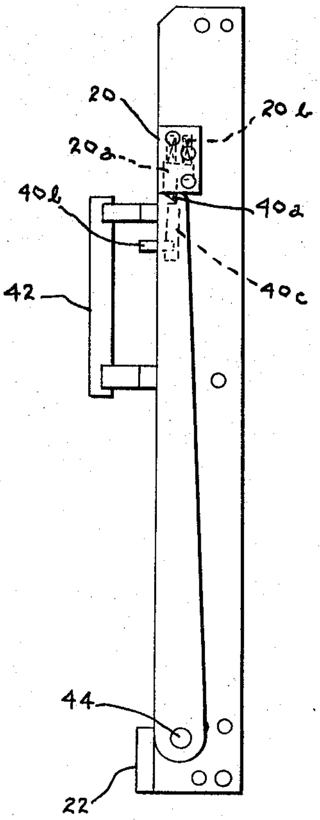
FIGURE 2 is a side elevational view of the assembly of FIGURE 1.

Along the outside channel members such as 18 are disposed a series of resilient pads 28, the function and use of which will be hereinafter described. Disposed at spaced points in the center vertical bar 30 are hooks 32, generally centered relative to the horizontal midline of a pair of boards 34. The function of hooks 32 will be described hereinafter. At the bottom of assembly 10 is disposed a front bay driving and camming mechanism tied to an operating arm 42 which is adapted to be manipulated by a handle 42 in an arc outwardly from the assembly as shown in FIGURE 1 or downwardly to the left from the assembly shown in FIGURE 2. The bottom of arm 40 is affixed to a shaft 44 which extends across the bottom of the assembly beneath a cover plate 22 to drive a pair of cams 46 disposed on the outside edges adjacent the side rail members of the assembly. Bearings not shown support the cams and the shaft 44 for rotary movement. As depicted in FIGURES 1 and 2 the cams 46 are in the position of maximum upward travel, which is the position of full closure for the assembly. As arm 40 is moved outwardly and downwardly the surfaces of the cams 46, relative to fixed points along their upper surfaces, move downwardly to drop the front bay installed in the rear bay to open the system circuits and permit removal of the front bay.

A latch mechanism is included attached to the side of the outside channel members, such as 18, in a position to engage the upper end of the arm 40. The latch mechanism shown as 20 is comprised of a metallic block hollowed out to contain an operator **20*a* driven by a spring 20*b* downwardly in a vertical sense to engage a slot 40*a*, which is shaped to mate with the operator 20*a* and hold the handle 40 against accidental displacement. Within the upper end of 40 is a latch release pin 40*b*, which is adapted for movement upwardly such that its end 40*c* engages the operator 20*a* and drives such upwardly to permit the arm 40** to be pulled outwardly for opening the system.

Figure 3:
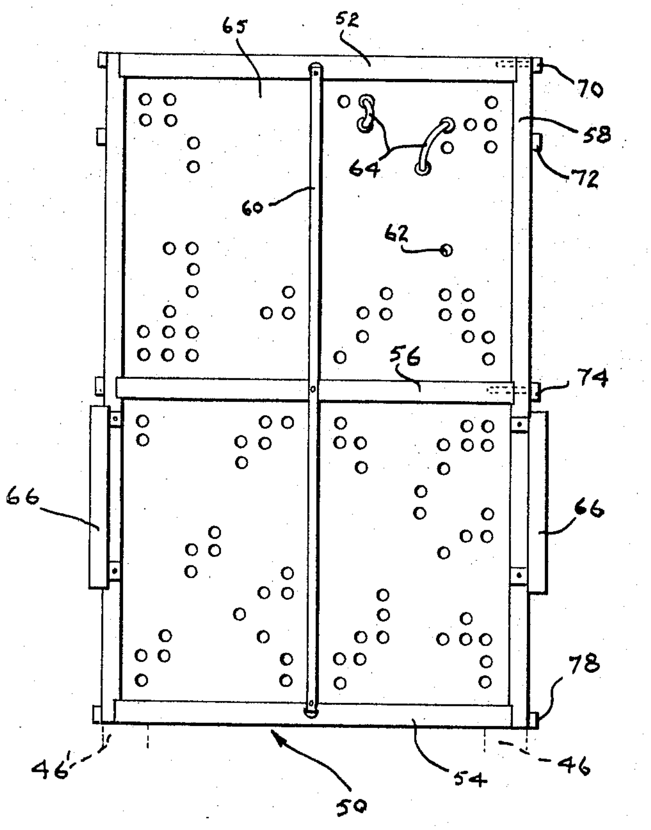
FIGURE 3 is a front elevational view of the front bay of the assembly of the invention.
Figure 4:
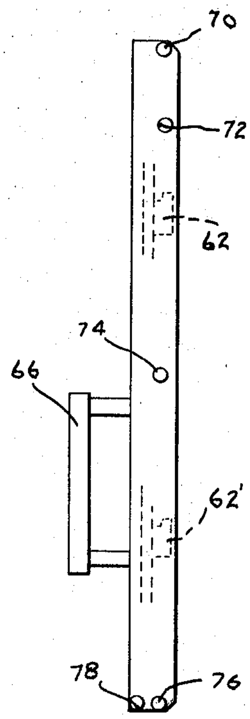
FIGURE 4 is a side elevational view of the assembly of FIGURE 3.

FIGURES 3 and 4 show a front bay assembly 50 adapted to work with the rear bay assembly 10 just described. Assembly 50 is comprised of an outer frame of metallic members, including top and bottom members 52 and 54 and a center member 56 joined at the ends by side members such as 58. The outer frame is tied together by the center vertical bar 60. The frame of assembly 50 carries a series of boards 65 of insulating material apertured as at 62 to receive and contain patchcords such as 64, which extend through and project outwardly from the face of assembly 50 and in operation engage the contact springs 38 of the rear bay to close circuit paths. In use the front bay is carried by handles shown as 66 and positioned within the rear bay to be driven upwardly by the cams 46 to close the various patchcord tips with the various rear bay contact springs. As indicated in FIGURES 3 and 4, on each side of the assembly 50 and projecting from the surfaces of the side channel members are a series of posts 70, 72, 74, 76 and 78, which serve the function of guiding, positioning, latching and finally, locking the front bay within the rear bay. Secured proximate the center line of upper and lower pairs of panels to the bar 60 are hooks 62, which engage the hook members of the rear bay in a manner to be described.

Figures 5, 6, 7, 8:
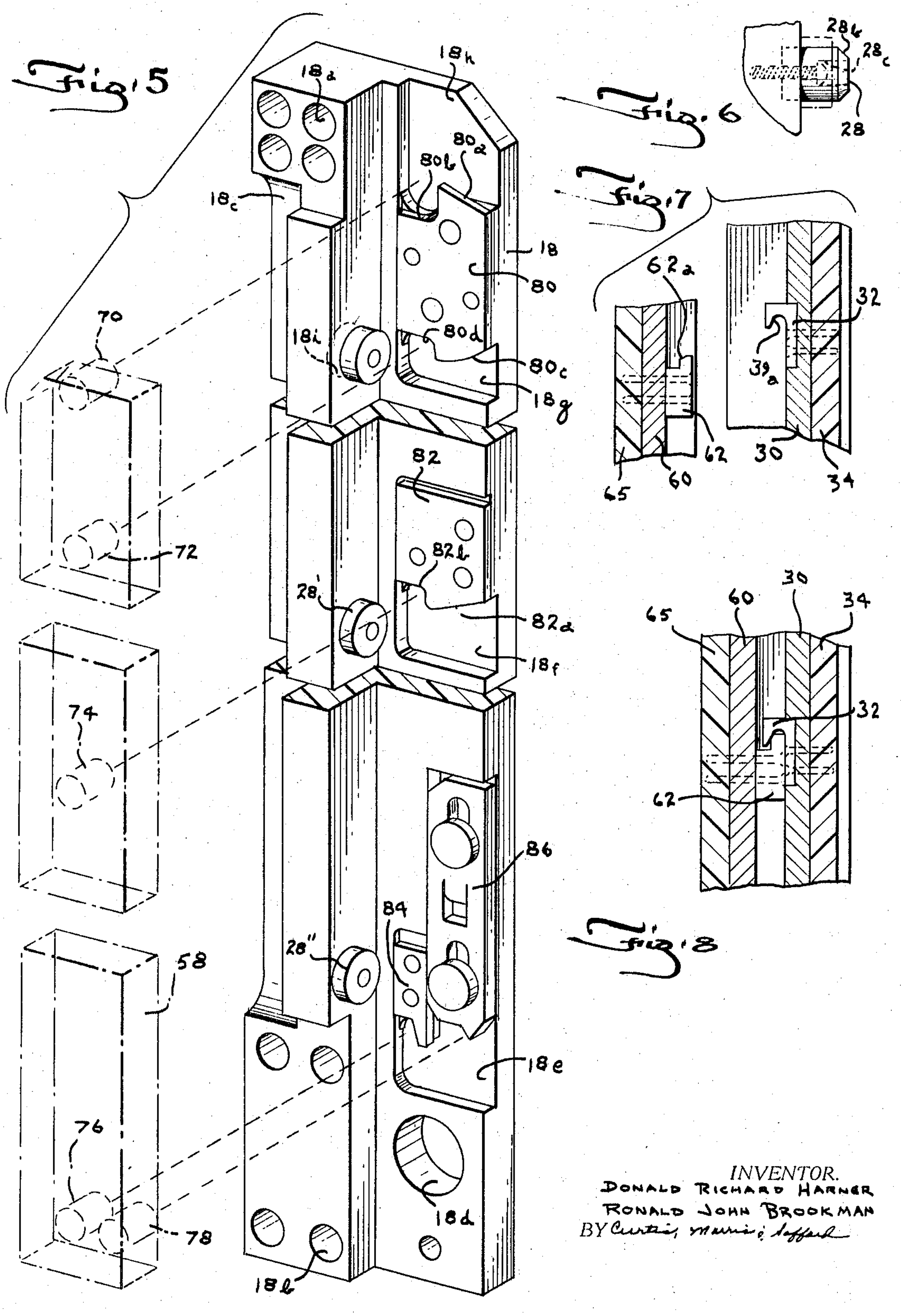
FIGURE 5 is a perspective showing the righthand channel of the rear bay of FIGURE 1 as viewed from the inside in conjunction with a partial view of a side rail piece of the front bay of FIGURE 3, including the post members thereof in alignment for mating with the rear bay channel.
FIGURE 6 is a side elevation showing the construction and operation of one of the resilient pads employed in the rear bay.
FIGURE 7 is a side view, partially sectioned, of a segment of the front and rear bays showing the locking hooks of each member.
FIGURE 8 is a view of the segments of FIGURE 7 in closure.

Referring to FIGURES 3, 4 and 5, a detailed description will now be given as to the structure and operation of the system parts which guide, position and secure the front bay assembly 50 within 10 in a manner to withstand vibration, shock and the like. In FIGURE 5 the rear bay side channel 18 is shown relative to the front bay side member 58 and the posts secured thereon. The attitude of 58 relative to 18 is that which occurs when the front bay is positioned in the rear bay in a fully closed position. Side channel 18 is L-shaped in cross section to include a rear and thickened portion having a series of apertures at the top shown as **18*a* to accommodate threaded or other members to tie the side pieces to the top channel 12. Similar apertures 18*b* are disposed at the bottom of the side piece to tie the side pieces to the bottom channel 14. Extending vertically along the rear of 18 is a slot 18*c* adapted to accommodate the outside edge of boards 34. The forward portion of the side channel includes, at the bottom, an aperture 18*d* adapted to accommodate shaft 44 of the camming mechanism and above that a further relief 18*e* which accommodates the lower latching and locking mechanism of the assembly. Further reliefs 18*f*, 18*g* and 18*h* permit the front bay posts to move within the channel to engage plate members disposed therein. A series of recesses 18*i* are provided along the length of channel 18 extending outwardly toward the plane of the front bay and adapted to contain the resilient pads 28. These pads are, as indicated in FIGURE 6, set into recesses 18*i*** and secured by screws. The dotted line indicated the outline assumed by the pads in compression.

The locking and latching plates secured to the side rail 18 include a top plate 80, an intermediate 82 and a lower plate 84. A latch assembly 96 is secured adjacent the lower plate 84. This latch assembly is described in U.S. Patent No. 3,170,746 granted Feb. 23, 1965. The upper plate 80 is rigidly affixed to the side rail 18 and includes an upper surface comprised of a sloped and flattened portion **80*a* followed by a recessed portion 80*b*. The portions 80*a* and 80*b* accommodate the upper pin 70 of the front bay such that as the front bay is inserted within the rear bay the pin 70 engages 80*a* and moves therealong to drop into the recess and engage 80*b* and be held thereby for pivotal swinging movement further into the rear bay. The lower part of plate 80 includes portions 80*c* followed by a recess extending upwardly defined by portions 80*d*, which are engaged by pin 72 when the front bay is pivoted into the rear bay. If the front bay is not properly seated with pin 70 in an engagement with 80*b*, the pin 72 will strike the vertical edge of the plate 80, blocking further installation and pivotal movement of the front bay to thus avoid damage to patchcord tips or rear bay springs or other parts thereof. To install the front bay within a rear bay then, the front bay is grasped by the handles 66 and moved at an angle toward the rear bay with the pins 70 on each side thereof being caused to engage portions 80*a* and slide backwardly to engage the portions 80*b* and drop down to a position such that pivotal movement of the front bay will be permitted by the proper alignment of pins 72 with the portions 80*c*** of the plate.

The intermediate plate 80 includes a surface having a sloped portion 82*a* and a further recessed portion 82*b* adapted to be engaged by pin 74 of the front bay. The lower plate 84 includes no lead in but rather a rearwardly directed surface portion 84*a* adapted to engage the rear lower pin 76 of the front bay. The forward pin 78 of the front bay engages the operator of the latch 86 and drives such upwardly under spring pressure until the front bay is fully seated within the rear bay whereupon the operator of 86 is driven downwardly over the outside of pin 78 to latch the assembly in position. The positioning of the various pins 70–78, in conjunction with the positioning of the various plates 80–84 very accurately guide the front bay into position.

Additionally, the plate surface portions 80*d*, 82*b* and 84*a* are inclined at an angle and positioned relative to the surface disposition of pins 72, 74 and 76 prior to the upward drive of the front bay to develop inwardly directed forces driving the front bay in against pads 28.

Also related to the positions of the pins and plates are the hooks 32 of the rear bay and 62 of the front bay, centered in the bays as shown in FIGURES 1 and 3. These hooks are shown in detail in FIGURES 7 and 8 and are secured to the center bars 30 and 60, respectively, and to the boards 34 and 65, by screws or other means extending through the hooks into these members. The rear bay hooks 32 are seated within the bar 30 in a recess as indicated in FIGURES 7 and 8 and are directed downwardly to include a surface portion 32*a* sloped downwardly and outwardly from the plane of the boards of the rear bay at a slight angle as indicated. The front bay hooks are secured on the face surface of the bar 60 and directed upwardly. A slightly beveled and angled surface portion 62*a* having an angle related to that of 32*a* is included on the inner portion of the upwardly projecting part of the hook 62 for mating relation with the rear bay hook 32. This mating is shown in FIGURE 8 as it occurs when 50 is driven upwardly in 10 by the camming mechanism.

Figures 9A, 9B:
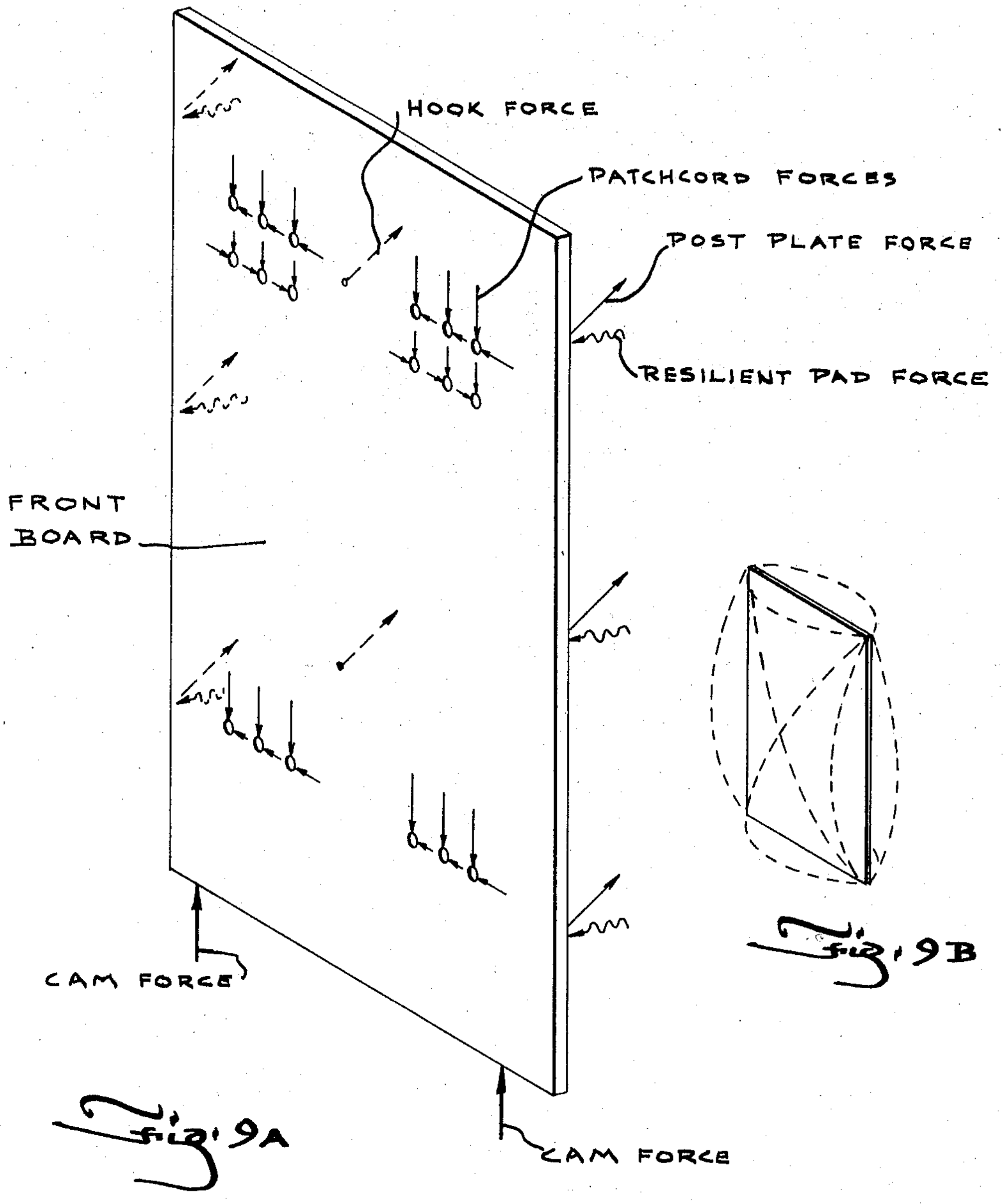
FIGURE 9A is a schematic diagram depicting the forces developed in the system of the invention which counter the "diaphragming" action shown in FIGURE 9B.

Referring now to FIGURE 9A, the cumulative effect of the various engagements heretofore described is schematically depicted relative to the front bay, it being understood that equal and opposite forces operate on the back bay accordingly. Considering the front bay to be installed within the rear bay and fully cammed upwardly, there are two quite substantial vertically disposed forces, denominated cam forces, operating on the corners of the front bay frame in an upward sense. These are directly opposed by a series of smaller forces, denominated patchcord forces, transmitted from the patchcord pins under drive from the various rear bay contact springs disposed throughout the plane of the front board. Further, because of the angular disposition of the contact springs and the orientation of the individual springs, force components are developed as shown by the small arrows in a horizontal sense tending to hold the front bay against net side movement relative to the rear bay. Thus, the front bay is held in a spring system fully operable from several opposed points of the major plane of the bay by the combination of camming forces and the patchcord forces, which are related to the rear bay contact springs and the orientation thereof.

Vibration operating in a transverse sense to the major surface plane of the front board is resisted by a combination of the post-plate forces and the hook forces pulling at the board at points along the side and at points in the center as resisted by resilient pad forces along the sides. These forces prevent "diaphragming," which is, as mentioned, the principal failure mode relative to this transverse plane as indicated by the dotted lines in the smaller view of the front bay in FIGURE 9B. Since the front bay is held in a resilient system developed through pads 28 linked to the rear bay, the front bay and rear bays tend to vibrate in a commoned resonance and not at individual resonances, which would be the case if forced together through a non-resilient medium.

From FIGURE 9A it will be seen that the free span of the bays is reduced in length and area to a fraction of major length and area dimension. This operates to prevent the development of low frequency resonance.

In an actual embodiment of the invention the various frame members were of high tensile aluminum alloy and the resilient pads were of urethane having a durometer of approximately 92. The resilient pads were sized so as to be compressed from 2 to 10 percent. In an actual system built in accordance with the invention and tested by the application of currents to the various circuits in a pattern disposed over the surface of the bays no open circuits or points of high resistance were observed throughout a series of vibration cycles. This test included three logarithmic sweeps of applied, simple harmonic motion for various periods of time up to twenty minutes, including a range of frequency from 10 c.p.s. to 2000 c.p.s., at separately applied movements of double amplitude and peak acceleration. This system was also subjected to substantial shock and inertial stress without failure of contact circuit paths.

The foregoing description is our effort to disclose a preferred mode of practice of the invention which we intend to be defined by the appended claims.

What is claimed is:

1. In a multiple switching device of the type adapted to make and break electrical contact paths and to maintain electrical circuits in high vibration and shock environment, the combination comprising relatively movable panels of substantial surface area each carrying contact members adapted for mutual engagement, driving means to drive one panel in substantially parallel movement relative to the other panel, the contact members of one of the panels including spring characteristics developing spring forces acting in the planes of such panels, the said driving means acting on an edge surface of the one panel to develop a substantial force operating in the plane of said panels opposing the spring forces developed by said contact members, the said panels each having a frame, first means on each frame adapted for mutual engagement to develop forces operating to lock said panels in planes transverse to the major plane of said panels and transverse to the forces developed by said spring systems, second means on one frame adapted to engage the other frame, said second means having characteristics of resiliency and being positioned to be compressed by the engagement of said first means whereby the said panels are held against relative movement and each of the panels is held against diaphragming.

2. The device of claim 1 wherein said first means are distributed along the sides of said panels and in the center thereof and said second means are distributed along the sides of said panels at points substantially adjacent to said first means.

3. The device of claim 1 wherein said first means is comprised of metallic members rigidly affixed to the frames of said panels having surfaces relatively inclined and positioned to develop said forces under an increasing wedging pressure.

4. The device of claim 3 wherein said second means are pad members countersunk into the surface of said one frame to be locked against displacement by said wedging pressure.

5. In a multiple switching device of the type to make and break electrical contact paths and to maintain electrical circuits in high vibration and shock environment, the combination comprising a rear bay carrying spring contact members, a front bay carrying pin contact members positioned in alignment relative to said spring contact members, means to carry said front bay into position in said rear bay and to drive said front bay upwardly to effect an engagement of said pin and spring contact members, plate members secured to said rear bay having surfaces inclined at an angle relative to the upward movement of the front bay, post members secured to said front bay positioned to engage the plate surfaces and be driven inwardly as said front bay is driven upwardly, resilient pad members disposed in said rear bay at positions to engage the front bay and be compressed thereby to develop forces acting in planes generally transverse to the major planes of said bays and lock said bay together against relative movement.

6. The device of claim 5 wherein the said plate and post members are positioned along the sides of said bays and there is included on each bay substantially along the vertical center line a hook member rigidly secured thereto, a surface of the hook member of the front bay being oriented and positioned to engage a surface of the hook member of the rear bay and lock the centers of the bays together as said front bay is driven upwardly in said rear bay.

7. The device of claim 6 wherein the surfaces of the plate and hook members have a vertical length greater than the upward travel of the front bay relative to the rear bay.

8. In a plugboard system adapted to operate in vibration environment the combination comprising front and rear panels, means to guide the panels in relative parallel movement to a point of closure, means affixed to said boards for mutual spring engagement developing opposing forces acting in the major plane and the panels and means affixed to said panels for mutual spring engagement developing opposing forces acting transverse to the major plane of the panels, the said forces resisting relative movement between said panels following closure.

9. The system of claim 8 wherein the second mentioned means includes members distributed over the surface and along the edges of said panels to reduce the free span length of the panels to approximately half or less of the major dimension thereof.

10. The system of claim 8 wherein the second mentioned means includes members distributed over the surface and along the edges of said panels to reduce the free span area to approximately one-fourth or less of the area of the major plane of the panels.

No references cited.

ROBERT K. SCHAEFER, *Primary Examiner.*

J. R. SCOTT, *Assistant Examiner.*